July 8, 1969        G. CHAPLENKO        3,454,957
RECIPROCAL MOTION CONTROL APPARATUS
Filed June 14, 1966
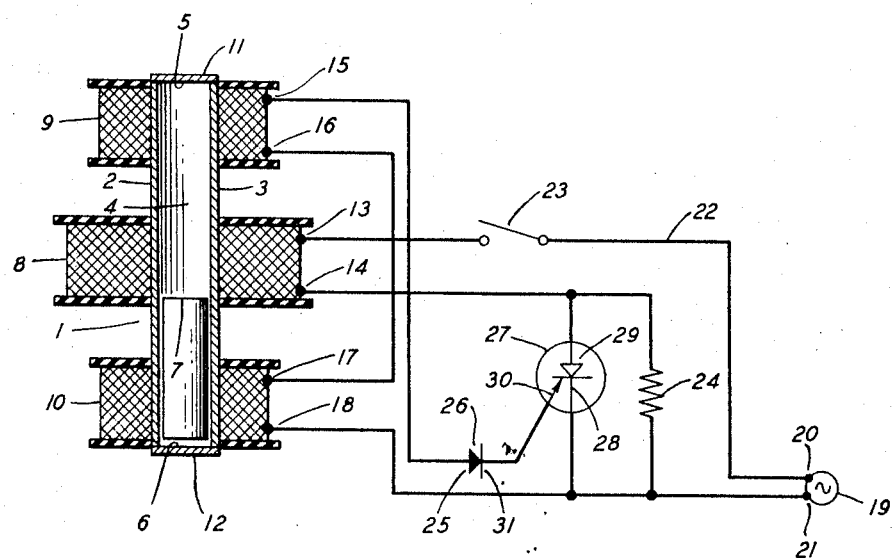
INVENTOR
GEORGE CHAPLENKO
BY
Frederick W. Padden
ATTORNEY

United States Patent Office 3,454,957
Patented July 8, 1969

3,454,957
RECIPROCAL MOTION CONTROL APPARATUS
George Chaplenko, Edison Township, Middlesex County,
N.J., assignor to Spex Industries, Inc., Metuchen, N.J.,
a corporation of New Jersey
Filed June 14, 1966, Ser. No. 557,537
Int. Cl. H02p 7/06; H02k 33/12, 33/14
U.S. Cl. 318—122                     5 Claims

ABSTRACT OF THE DISCLOSURE

A thyristor switch with a pair of gating and solenoid coils are disclosed for driving an armature backward and forward between two opposite ends of a bore within a cylindrical guidance tube.

---

This invention relates to reciprocal motion control apparatus and particularly to electrical circuitry utilizing a thyristor switch for controlling a solenoid coil and switching inductors to drive an armature backward and forward within the bore of a guidance tube.

Electrical control devices are presently available for controlling the reciprocal movement of an object within a guiding element. These devices are typically used, for example, in electric jigsaws, sewing machines, impact grinders, and mixing equipments.

Although such devices are technically reliable, they generally convert a rotary motion to a reciprocal and, therefore, need a large number of delicate parts and, in many instances, are costly and complex in construction and operation. These factors tend to limit the widespread marketability and use of the control devices.

It is therefore an object of my invention to provide simple and economical facilities for controlling the reciprocal movement of a device within a guidance element.

Another object is to reduce the number of parts needed for such control facilities and particularly to provide durable structural elements.

The single figure of the drawing is a sectional view of the reciprocating apparatus embodying the invention.

These and other objects are attained in accordance with a specific exemplary embodiment of my invention wherein simple and economical facilities including a thyristor (pnpn thyratron) switch are furnished for driving an armature backward and forward between two opposite ends of a bore within a cylindrical guidance tube. In addition, the structural elements utilized for achieving the reciprocal movement of the armature are durable and minimal in number.

Specifically, the illustrative embodiment of my invention comprises an elongated cylindrical guidance tube having an inner bore in which an armature of suitable magnetic material moves backward and forward between first and second end segments of the tube. A solenoid coil is wound around an exterior midsection of the tube for controlling the reciprocal movement of the armature. First and second switching, or gating, coils are also wound in series around first and second exterior end segments, respectively, of the cylindrical tube essentially adjacent to both sides of the solenoid. The armature acts as a transformer core and provides for coupling alternately between the solenoid and the first and second coils during its movement within the bore.

Alternating current (AC) is applied to the solenoid through a bias resistor and enables a gating voltage to be induced alternately in each of the first and second coils due to the cyclic movement of the armature therein. This gating voltage on each predetermined half cycle of the applied AC is used for gating, or switching, a thyristor from its nonconduction state to its high conduction state and thereby increasing the current flow through the solenoid coil to move the armature within the bore by extracting it from a location within, for example, the first switching coil toward a location within the solenoid.

When the latter action occurs, the gating voltage is substantially removed from the thyristor and subsequently the AC voltage diminishes below the holding value for the thyristor to switch it into its nonconduction state, thus to reduce the current through the solenoid. As a result, the armature by inertia continues its movement within the bore in the same direction toward the second switching coil.

As the armature reaches a location within the second coil, one of the succeeding half cycles of the applied AC causes the bias current through the solenoid to induce a gating voltage in the second coil for again switching the thyristor into its high conduction state. Thereupon, a high current flows through the thyristor and the solenoid for moving the armature within the bore by extracting it from a location within the second coil and attracting it toward a location within the solenoid. The induced gating voltage diminishes when the latter action occurs. Shortly afterwards, the applied AC diminishes below the holding value for the thyristor and it is switched into its nonconduction state. This reduces the current through the solenoid back toward the bias level and the armature by inertia continues its movement within the bore toward the first switching coil to complete one cycle of the circuit operation.

Advantageously, the illustrative embodiment utilizes a thyristor switch which has its anode and cathode electrodes connected across the bias resistor for cyclically supplying a low cathode to anode impedance path for applying the aforementioned high currents through the solenoid. The thyristor also comprises a gate electrode which is connected to a unidirectional current device and is responsive to the gating voltages from the first and second switching coils for triggering the thyristor into its high conduction state and thereby providing the low cathode to anode impedance path.

In accordance with another aspect of my invention, first and second container covers are secured to the respective first and second end segments of the cylindrical tube. These covers seal the bore of the tube during its reciprocal movement therein.

The foregoing and other objects, features and advantages of my invention will be more clearly understood from a reading of the following description of an illustrative embodiment thereof with reference to the schematic drawing of its electrical circuitry.

The drawing discloses a guidance tube 1 being of a cylindrical shape and having a wall depicted as cross-section members 2 and 3, defining an inner bore section 4 with upper and lower apertures 5 and 6. An armature 7 comprising a suitable material, such as soft iron, having predetermined diameter and length is located within the bore 4 and is movable therein between the apertures 5 and 6 under control of the solenoid coil 8 and switching inductor coils 9 and 10, as later described. Containing covers 11 and 12 are affixed to the tube 1 to cover the apertures 5 and 6, respectively, and to seal the armature 7 within the bore 4 during the extremes of its movement therein.

Solenoid coil 8 is shown having the terminals 13 and 14 and as wound about an exterior midsection of tube 1. Coils 9 and 10 comprise the terminals 15, 16 and 17, 18, respectively, and are shown wound in series about upper and lower sections of tube 1 between the solenoid and the apertures 5 and 6, respectively.

A power source 19 is employed to supply AC to its terminals 20 and 21. Terminal 20 is connected over a wire 22 and through an ON-OFF switch 23 to terminal 13 of solenoid 8 while terminal 21 is connected through a bias resistor 24 to terminal 14 of coil 8. Terminal 15 of coil 9 is connected to an anode 25 of a diode 26 and terminal 18 of coil 10 is connected to the power supply terminal 21.

A thyristor switch 27 is utilized in the circuit for switching current through the coil 8. Thyristor 27 comprises cathode, anode and gate electrodes 28, 29 and 30, respectively. The gate electrode 30 is connected to the cathode 31 of diode 26. Cathode electrode 28 is connected to terminal 21 of power supply 19. Anode 29 is connected to terminal 14 of coil 8. The resistor 24 is connected between cathode 28 and anode 29 for supplying a low bias current through coil 8.

When armature 7 is removed from the bore 4 and switch 23 is closed to apply AC power to the circuit, thyristor 27 remains in its nonconduction state and a small bias current flows from source 19 through resistor 24 and coil 8. The insertion of armature 7 into the bore 4, so that it is adjacent to coils 8 and 9 or 8 and 10, enables it to act as a transformer core which is responsive to the bias current flowing through coil 8 for inducing an AC voltage alternately in the switching coils 9 and 10. When the armature 7 is in the position shown in the drawing and positive and negative potentials of one half of the AC from source 19 are supplied to terminals 20 and 21, respectively, bias current flows through resistor 24, coil 8, switch 23 and wire 22 for inducing a gating voltage across coil 10. This voltage is extended through diode 26 to gate electrode 30 for switching thyristor 27 into its high conduction state whereby its cathode 28 to anode 29 impedance is low for passing a high current through coil 8. As the AC current through coil 8 increases, armature 7 is attracted in bore 4 away from coil 10 and toward coil 8. This movement of armature 7 uncouples coil 10 from solenoid coil 8 for substantially removing the gating voltage from diode 26 and gate electrode 30.

Thyristor 27 shortly thereafter is switched off when its holding current in the half cycle of the AC from source 19 decreases below a prescribed level. During the later switching operations, armature 7 by inertia continues in its movement in bore 4 away from coil 10 through coil 8 toward coil 9 and into contact with the containing cover 11.

As this movement is in progress, the latter half cycle terminates and a succeeding half cycle of AC is applied by source 19 for passing a bias current through coil 8 which coperates with armature 7 to induce a gating voltage in coil 9. This gating voltage forward biases diode 26 ond gates thyristor 27 into its high conduction state whereby its cathode 28 to anode 29 impedance is low for passing a high current through coil 8. As the latter AC current increases, armature 7 is attracted in bore 4 away from coil 9 toward coil 8. This movement uncouples coil 8 from coil 9 for substantially removing the gating voltage from diode 26 and gate electrode 30.

Thyristor 27 shortly thereafter is again switched off when its holding current in the applied half cycle of the AC decreases below a prescribed value. Armature 7 by inertia continues its movement in bore 4 away from coil 9 through coil 8 toward coil 10 and into contact with the containing cover 12. When the latter action occurs, a cycle of the circuit operation is completed and the circuit is prepared for repeating another cycle in substantially the same manner as previously described.

It is to be understood that the hereinbefore described arrangements are illustrative of the application of the principles of my invention. In light of this teaching, it is apparent that numerous other arrangements may be devised by those skilled in the art without departing from the spirit and scope of the invention. To elaborate, the exemplary embodiment of my invention may be utilized as an impact grinder mechanism wherein the armature 7 comprises the object to be ground and the containing covers 11 and 12 provide the impact grinding surfaces. Accordingly, the containing covers may advantageously comprise a desired smooth or abrasive surface for impact with the armature. In accordance with another aspect of my invention, the armature 7 may advantageously comprise a vial into which a substance to be mixed is placed and the reciprocal movement of the vial provides for the mixing operation. It is also within the purview of my invention to affix a saw or blade or needle to a flat surface of the armature 7 and to extend such saw or blade or needle through one of the covers 11 or 12 for utilizing the structure of my invention as a saw or blade cutting device or sewing machine unit. Moreover, the AC power source 19 used in the exemplary embodiment may be replaced by a periodically occurring unidirectional current supply.

What is claimed is:

1. In combination,
   guidance means having wall members defining an inner bore having first and second end segments,
   a solenoid coil wound about the periphery of said wall members,
   first and second inductor coils each being wound about a respective individual one of said first and second end segments of said bore,
   an armature located within said bore and being reciprocally movable between said first and second end segments of said bore,
   means cyclically applying prescribed currents to said solenoid for cooperating with said armature to induce predetermined switching voltages in said first and second coils when said armature is located within said bore proximate said first and second coils,
   and a single thyratron switching device responsive to the receipt of said switching voltages from said first and second coils for cooperating with said current applying means for cyclically increasing the current applied to said solenoid whereby said armature reciprocally moves within said bore between said first and second end segments thereof.

2. The combination in accordance with claim 1
   wherein said current applying means comprises
   a power source applying alternating current having first and second half cycles,
   and means including an electrical resistance for applying said supplied first and second half cycles of current to said solenoid coil;
   and wherein said switching device is connected in parallel with said resistance and is responsive to each of said first half cycles of said supplied alternating current and to the receipt of said switching voltages from said first and second coils during said first half current cycles for providing a low impedance across said resistance whereby the current through said solenoid is increased, and said switching device being further responsive to said second half cycle of said supplied alternating current for providing a relatively higher impedance across said resistance whereby said armature reciprocally moves within said bore between said first and second end segments thereof.

3. The combination in accordance with claim 2
   wherein said switching device comprises a thyristor having cathode, anode and gate electrodes, said cathode and anode electrodes being connected across said electrical resistance, said gate electrode being connectable to said first and second coils and being responsive to the receipt of said switching voltages for switching said thyristor into a conduction state whereby a low impedance is established between said thyristor cathode and anode thus to increase the current through said solenoid coil.

4. The combination in accordance with claim 3 further comprising a unidirectional current device connected between said thyristor gate electrode and said first and second coils.

5. The combination in accordance with claim 4
wherein said power source comprises first and second terminals at which said alternating current is supplied;
said solenoid coil comprises a first terminus connectable to said first terminal of said power source and a second terminus connected to said second terminal of said power source via said electrical resistance;
said thyristor having its anode electrode connected to said second terminus of said solenoid coil and its cathode electrode connected to said second terminal of said power source,
said first inductor coil having a first end connected to said second terminal of said power source and a second end connected to a first end of said second inductor coil and said second inductor coil having a second end connected to said anode of said unidirectional current device for conveying said switching voltages to said gate electrode of said thyristor whereby said armature is reciprocally movable within said bore.

References Cited

UNITED STATES PATENTS

| | | | |
|---|---|---|---|
| 2,686,280 | 8/1954 | Strong et al. | 318—125 |
| 2,892,140 | 6/1959 | Praeg | 318—132 XR |
| 3,215,916 | 11/1965 | Hermann | 318—129 XR |
| 3,179,867 | 4/1965 | Delgado | 318—135 |
| 3,118,383 | 1/1964 | Woodward | 318—130 X |

MILTON O. HIRSHFIELD, *Primary Examiner.*

D. F. DUGGAN, *Assistant Examiner.*

U.S. Cl. X.R.

318—128, 132; 323—90